(12) United States Patent
Shah

(10) Patent No.: US 6,959,440 B1
(45) Date of Patent: Oct. 25, 2005

(54) DYNAMIC REMOVAL OF A DRIVER STACK WHEN A PARENT DRIVER USES A CHILD DRIVER

(75) Inventor: Rajesh R. Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 09/631,873

(22) Filed: Aug. 2, 2000

(51) Int. Cl.[7] .............................................. G06F 9/00
(52) U.S. Cl. ........................... 719/327; 719/324; 710/8
(58) Field of Search ............................... 719/321–327; 710/8, 603; 703/21; 709/223–227; 707/206, 707/103; 702/189

(56) References Cited

U.S. PATENT DOCUMENTS

| | | | |
|---|---|---|---|
| 5,748,980 A * | 5/1998 | Lipe et al. ..................... 710/8 |
| 6,016,466 A * | 1/2000 | Guinther et al. ............ 702/187 |
| 6,480,862 B1 * | 11/2002 | Gall ............................... 707/3 |
| 6,496,893 B1 * | 12/2002 | Arai ........................... 710/302 |
| 6,738,835 B1 * | 5/2004 | Kato et al. .................... 710/10 |
| 6,766,470 B1 * | 7/2004 | Shah .............................. 714/9 |
| 6,832,379 B1 * | 12/2004 | Zeryck et al. .............. 719/327 |

* cited by examiner

Primary Examiner—Larry D. Donaghue
Assistant Examiner—Mohammad Siddiqi
(74) Attorney, Agent, or Firm—Sharmini N. Green (57) ABSTRACT

A parent driver desiring to access a service of a child driver in a driver stack creates a virtual device object. The virtual device object is inserted into the driver stack below the child driver. When a query to dynamically remove the driver stack arrives at the virtual device object, the virtual device object notifies the parent driver. The parent driver stops accessing the child driver before directly receiving and processing the remove query, allowing the driver stack to be removed after all drivers in the driver stack process the remove query.

22 Claims, 10 Drawing Sheets

DYNAMIC REMOVAL OF A DRIVER STACK WHEN A PARENT DRIVER USES A CHILD DRIVER

FIELD OF THE INVENTION

This invention pertains to computer operating systems, and more particularly to dynamic removal of driver stacks from the operating system.

BACKGROUND OF THE INVENTION

Although computer systems begin with the hardware components, computer operation requires software that controls the use of the hardware components. Typically handled by the operating system running on the computer, these software elements are called device drivers (sometimes shortened to drivers). The device drivers are typically specific to the hardware component they support. Because accessing a particular hardware component requires cooperation among multiple software drivers, those device drivers are grouped true driver stacks (sometimes shortened to stacks). The drivers in each stack work together, allowing access to the desired hardware component.

Figure 1:
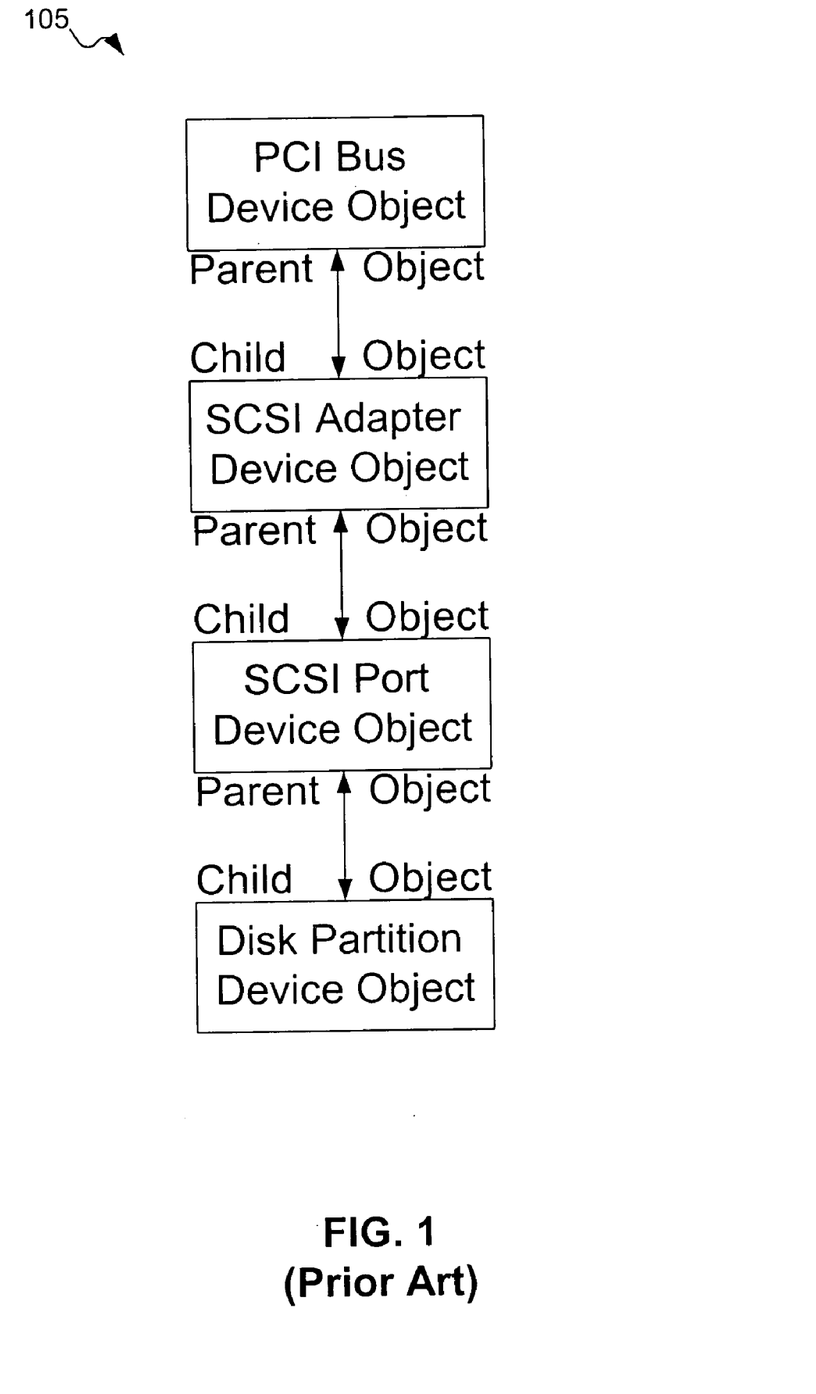
FIG. 1 shows a hierarchy of device driver object components in a computer system requiring a driver stack.

FIG. 1 shows software hierarchy 105 of software drivers to access a hard disk. Software hierarchy 105 is typical of hierarchies for accessing a particular hardware component. At the top of hierarchy 105 is the Peripheral Component Interconnect (PCI) bus driver. Below that is the Small Computer System Interface (SCSI) adapter driver. The SCSI adapter includes a SCSI port, onto which is connected the hard disk, which has a disk partition on which data may be stored. For each of the devices in the hierarchy, device drivers are needed to control access to the hardware devices. Below the SCSI adapter driver is the SCSI port driver.

Figure 2A:
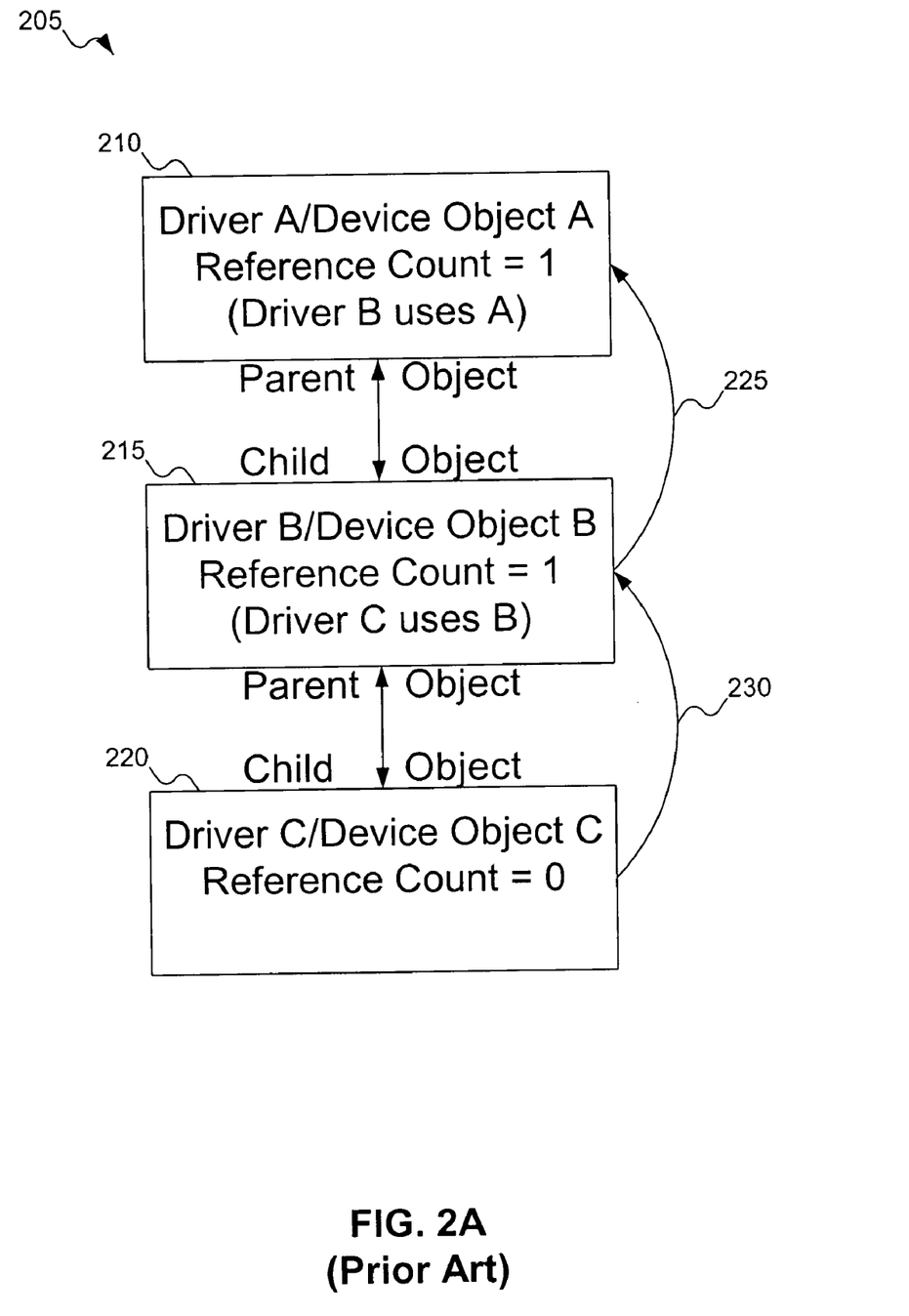
FIG. 2A shows a typical driver stack.

Each device driver may export services specific to that device driver. These services may be used by other drivers in the driver stack or by other programs, such as the operating system. FIG. 2A shows driver stack 205 with three device drivers 210, 215, and 220, each device driver providing a service. Driver 215 is using the service provided by driver 210 (as shown by arrow 225), and driver 220 is using the service provided by driver 215 (as shown by arrow 230).

Each driver needs to know if other drivers are using its services. This information is important in case the driver stack is to be removed (see below). Because their services are being used, drivers 210 and 215 have non-zero reference counts. Note that it is not important for the driver to know who is using its service, only that its service is being used.

Although FIG. 2A shows only children drivers using the services of their immediate parents, this is not a limitation of driver services export. For example, in FIG. 2B, driver 210 in driver stack 205 is shown using the services exported by its "grandchild," driver 220 (shown by arrow 235).

It may happen that a driver stack, loaded to allow access to a particular hardware component, is no longer required. For example, the hardware component in question may have been removed from the computer system. When a driver stack can be removed from the operating system while the computer is in use, the driver stack is called dynamic. The operating system interrogates each driver in the stack, asking the drivers if they may be removed. Then, if each driver in the stack approves the remove query, the driver stack is removed. (Static driver stacks are also possible, but in a static driver stack, the driver stack may not be removed while the computer is running. The static driver stack can only be "removed" by specifying it not be loaded when the computer is next started.)

Figure 3A:
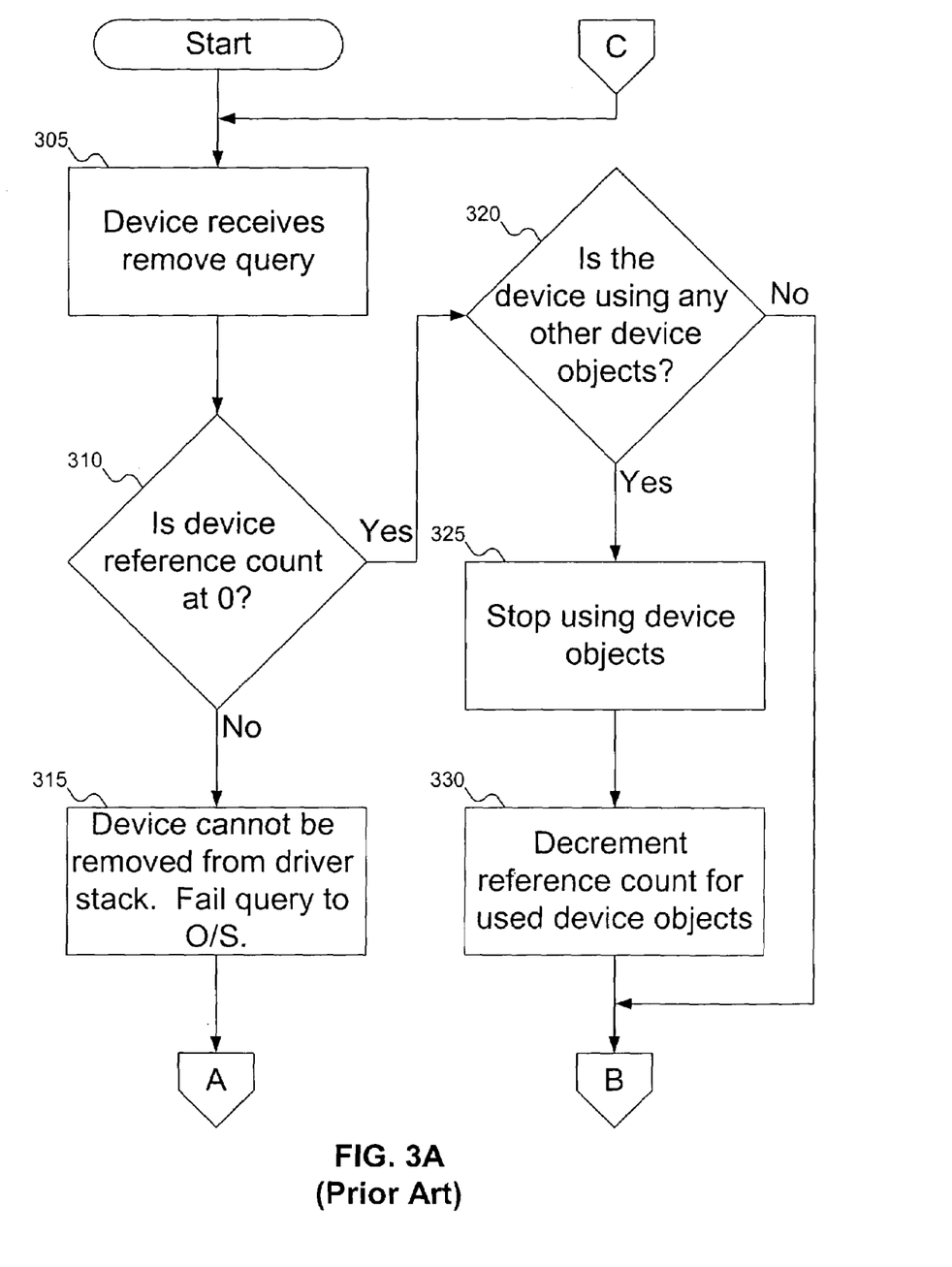
FIGS. 3A and 3B show the procedure used by an operating system to remove a dynamic driver stack.
Figure 3B:
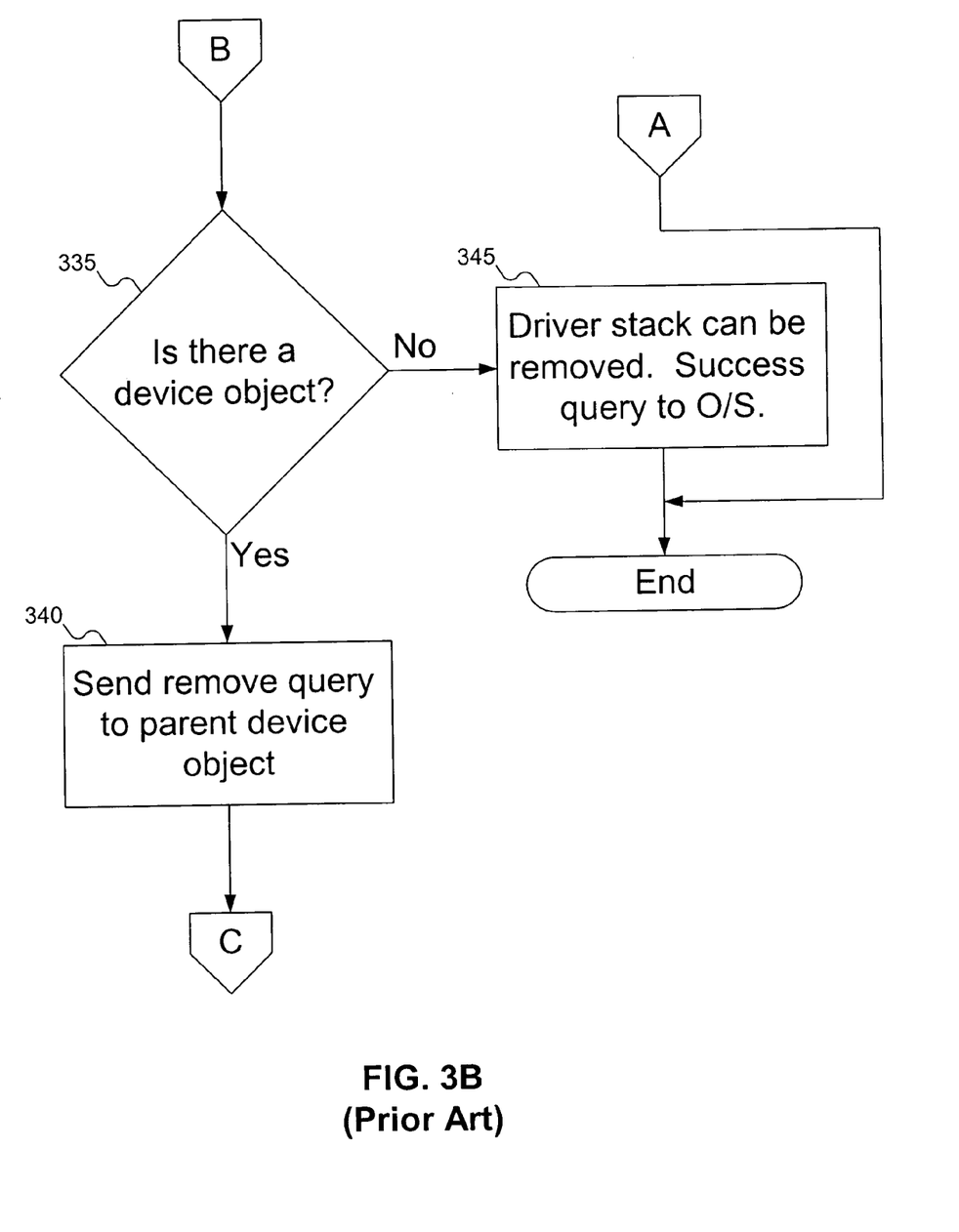

FIGS. 3A and 3B show the procedure used to query whether a driver slack may be removed. At block 305, the lowest device in the driver in the stack receives the remove query. At decision point 310, the device checks to see if its services are being used by any other programs. If its services are being used, then at block 315 the device signals the operating system that the driver stack may not be removed. Otherwise, at decision point 320 the device checks to see if it is using any services provided by other devices. If it is, then at block 325 the device stops using the service, and at block 330 the device decrements the reference count of the devices whose services it was using. At decision point 335, the device checks to see if it has a parent device in the driver stack. If it does, then at block 340 the device passes the remove query to its parent device, and the process returns to block 305. Otherwise, the last device in the driver stack has approved the remove query, and at block 345 the device signals the operating system that the driver stack may be removed.

Figure 2B:
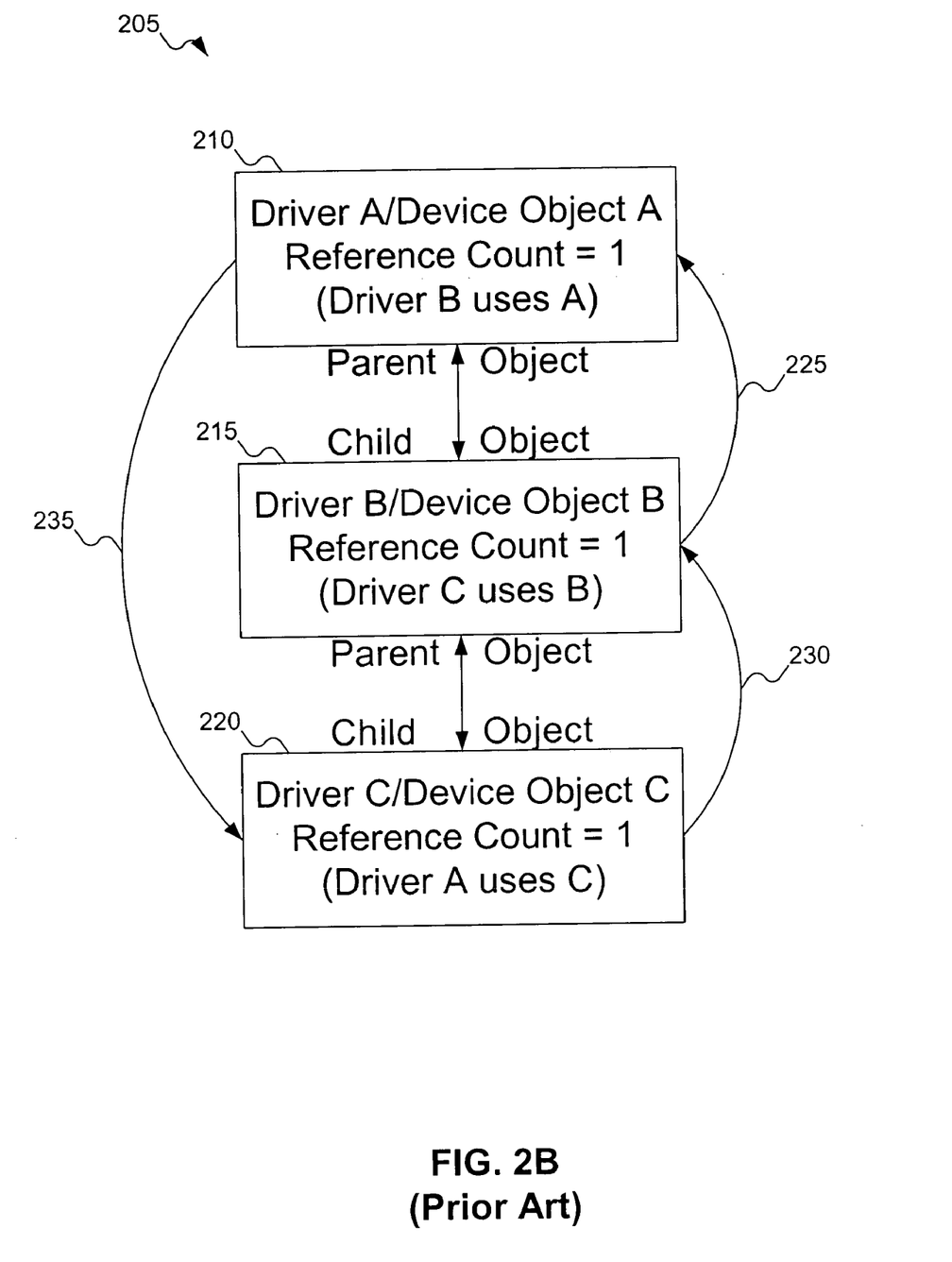
FIG. 2B shows the driver stack of FIG. 2A with a parent driver accessing a service of a child driver.

A person skilled in the art will recognize that the procedure of FIGS. 3A and 3B will fail when a parent device uses the services of a child device, as shown in FIG. 2B, because the child device must approve the remove query before the parent device receives notice of the remove query. Referring to FIG. 2B, child driver 220 will note that its services are being used and immediately fail the remove query. Parent driver 210 never has a chance to stop using the services of child driver 220, allowing the remove query to succeed.

The present invention addresses these and other problems associated with the prior art.

DETAILED DESCRIPTION

Figure 4:
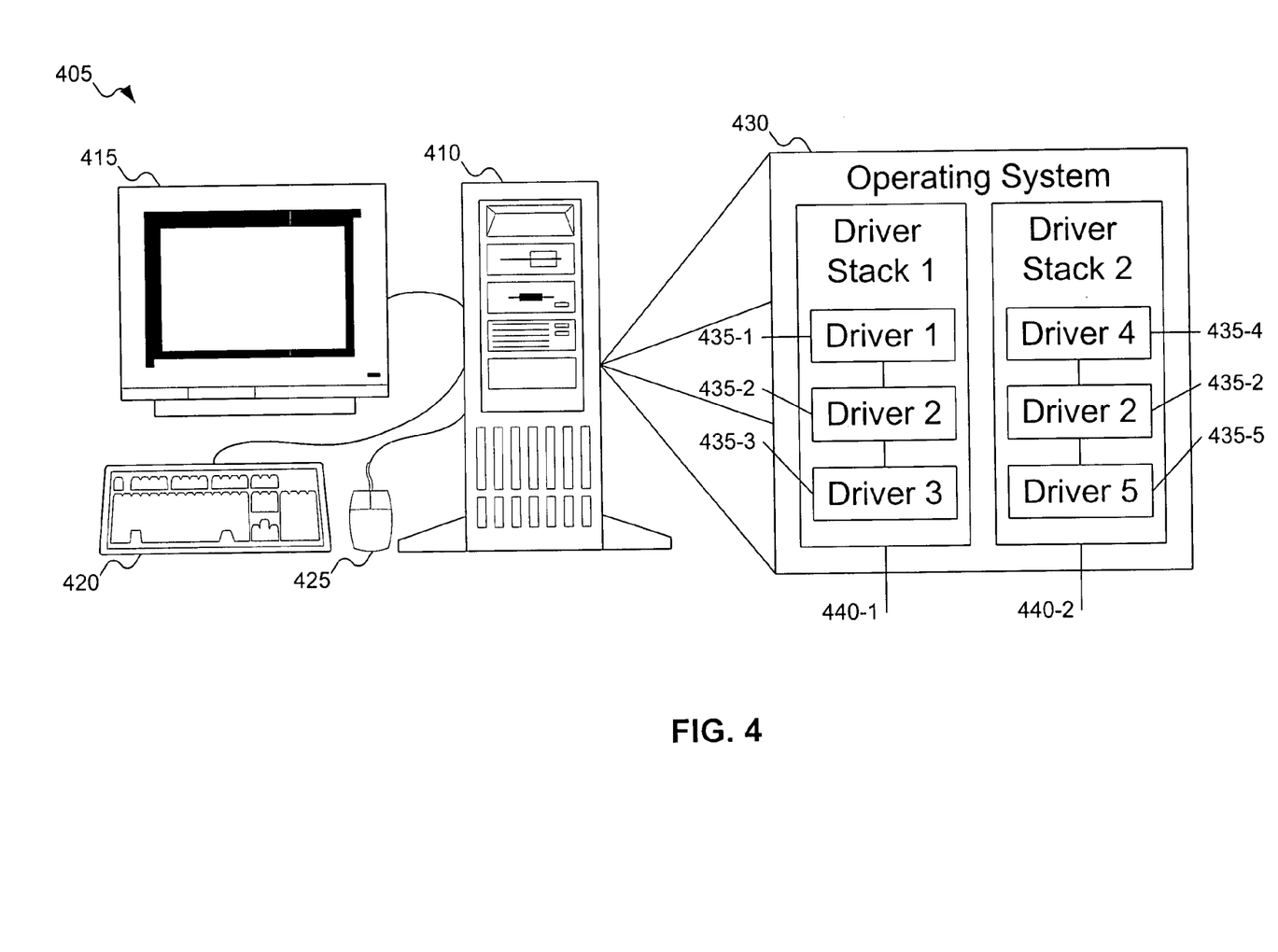
FIG. 4 shows a computer system running an operating system that may dynamically remove driver stacks in accordance with the invention.

FIG. 4 shows a computer system 405 in accordance with the invention. Computer system 405 includes a computer 410, a monitor 415, a keyboard 420, and a mouse 425. Computer 410 includes hardware components, such as a central processing unit, a memory, and a cache (not shown).

Computer system 405 may also include other equipment not shown in FIG. 4, for example, other input/output equipment or a printer.

Running on computer system 405 is operating system 430. Operating system 430 includes drivers, such as drivers 435-1, 435-2, 435-3, 435-4, and 435-5. These drivers are organized into driver stacks, such as 440-1 and 440-2. Note that driver stacks 440-1 and 440-2 are for exemplary purposes only. There may be more than two driver stacks loaded in operating system 430, and driver stacks 440-1 and 440-2 may have differing numbers of drivers within each driver stack. A person skilled in the art will also recognize that drivers may be duplicated in multiple driver stacks: for example, driver 435-2 is included in both driver slacks 440-1 and 440-2.

Figure 5:
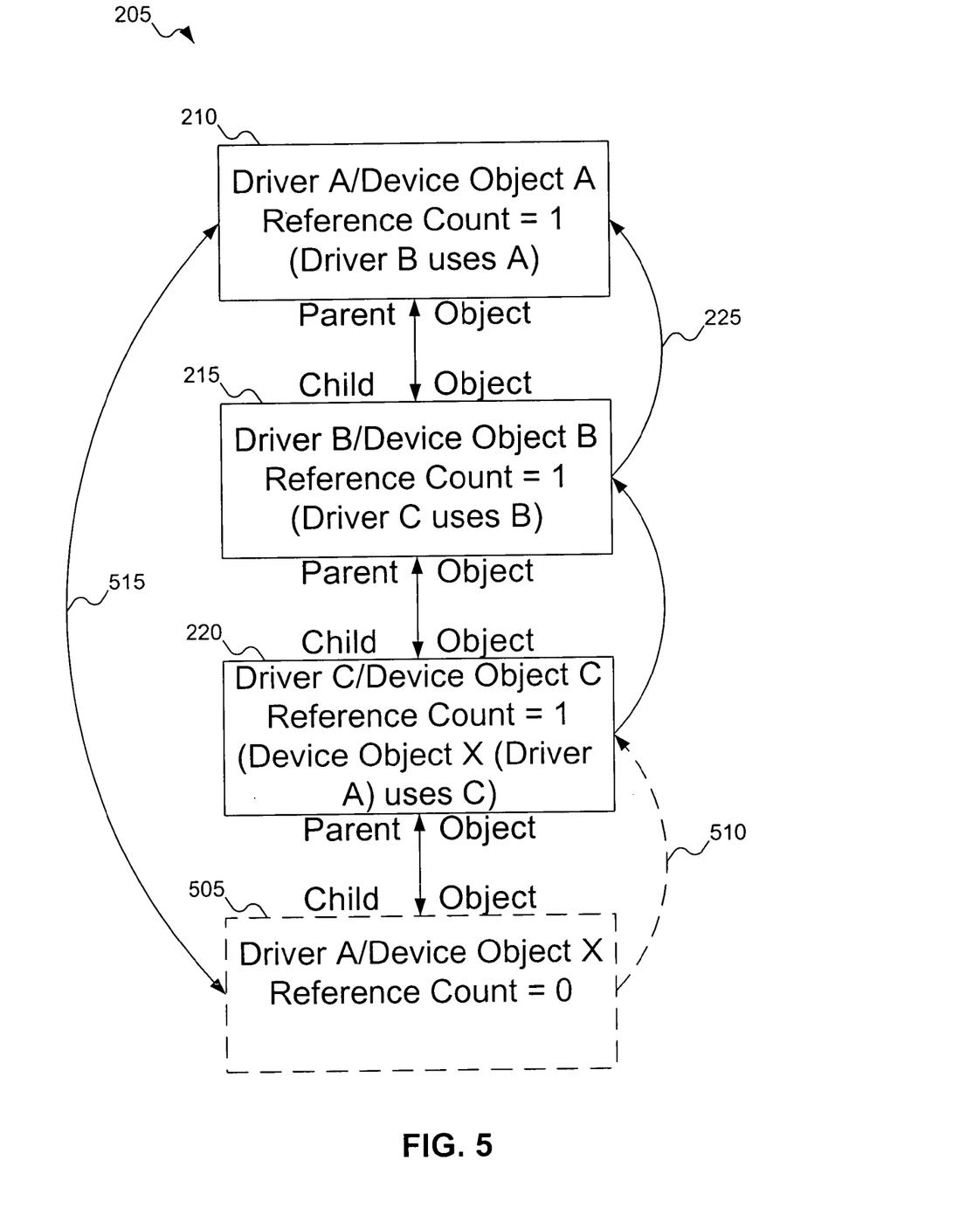
FIG. 5 shows the driver stack of FIG. 2B using a virtual device object in accordance with the invention.

FIG. 5 shows how driver stack 205 of FIG. 2B may be implemented according to the invention to allow for the removal of driver stack 205. In FIG. 5, parent driver 210 creates virtual device object 505. Virtual device object 505 is inserted into driver stack 205 below the accessed child device 220. In practice, virtual device object 505 will he placed at the bottom of driver stack 205. But if the implementation allows, virtual device object 505 may be inserted anywhere in driver stack 205, provided virtual device object 505 is below the accessed child device 220. Virtual device object 505 then accesses the service of child device 220 on behalf of parent device 210, as shown by dashed line 510. Virtual device object 505 is "bound" to parent device 210, as shown by line 515. In effect, virtual device object 505 is a "placeholder" for parent device 210. Parent device 210 "fools" child device 220 into thinking child device 220 is being accessed by a lower child device.

By creating virtual device object 505 and placing it in the driver stack below child device 220 whose services are being accessed, the standard remove query procedure of FIGS. 3A and 3B may be used. The remove query will he delivered to virtual device object 505 before it is delivered to child device 220. Virtual device object 505 then informs parent device 210 of the remove query. Parent device 210 can stop using the service of child device 220. Virtual device 505 may then approve the remove query and pass the remove query to child device 220. Because parent device 210 is no longer using the services of child device 220, child device 220 may also approve the remove query. The remove query iterates up the driver stack, and ultimately may be approved by every driver in the driver slack. The operating system is then able to remove the driver slack.

A person skilled in the art will recognize that this technique may be extended beyond the case of a single parent device accessing services of a single child device. Each parent device that wants to access a service of a child device may add a virtual device object to the driver stack below the accessed child device. Further, a single parent device may access the services of multiple child devices using a single virtual device object, provided the virtual device object is below all the child devices whose services are being used by the parent device.

It may happen that a new child device is added to the driver stack below the virtual device, the new child device providing a service desired by the parent device. The parent device may either add a new virtual device object or relocate the existing virtual device below the new child device in the driver stack. (In practice, it is preferable for the parent device to add a new virtual device object below the new child device and use the new virtual device object only for accessing the services of the new child device.)

Figure 6:
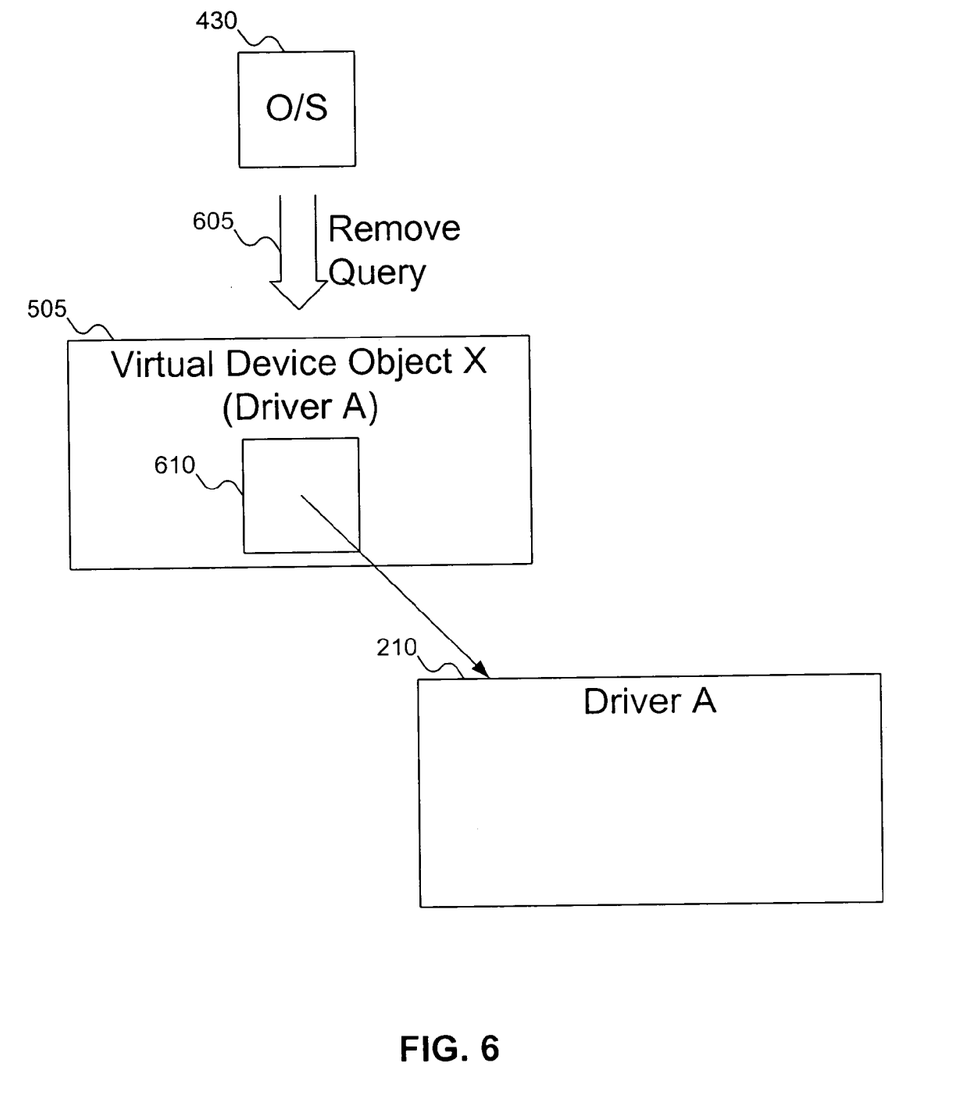
FIG. 6 shows a virtual device object in accordance with the invention redirecting a remove query to the parent driver in the operating system of FIG. 4.

Because the virtual device object is a placeholder for the parent device, the parent device is actually accessing the service of the child device. When the virtual device object receives a remove query from the operating system, the virtual device object lets the parent device know that the parent device should stop using the services of the child device. Referring to FIG. 6, since virtual device object X 505 is "bound" to driver A 210, when the operating system 430 sends remove query 605 to device object X 505 it is actually sending remove query 605 to driver A 210. Driver A 210 can then stop using the services of the child device, and virtual device 505 may pass remove query 605 to the next device driver in the driver stack.

There are several ways that virtual device 505 can inform parent device 210 about remove signal 605. One way is to use events, as described in object-oriented programming. Another way is for the operating system to directly invoke the code in the virtual device object. This code may directly link to code in the parent device for processing remove queries. A person skilled in the art will also recognize other techniques for passing the remove query from the virtual device object to the parent device.

Figure 7:
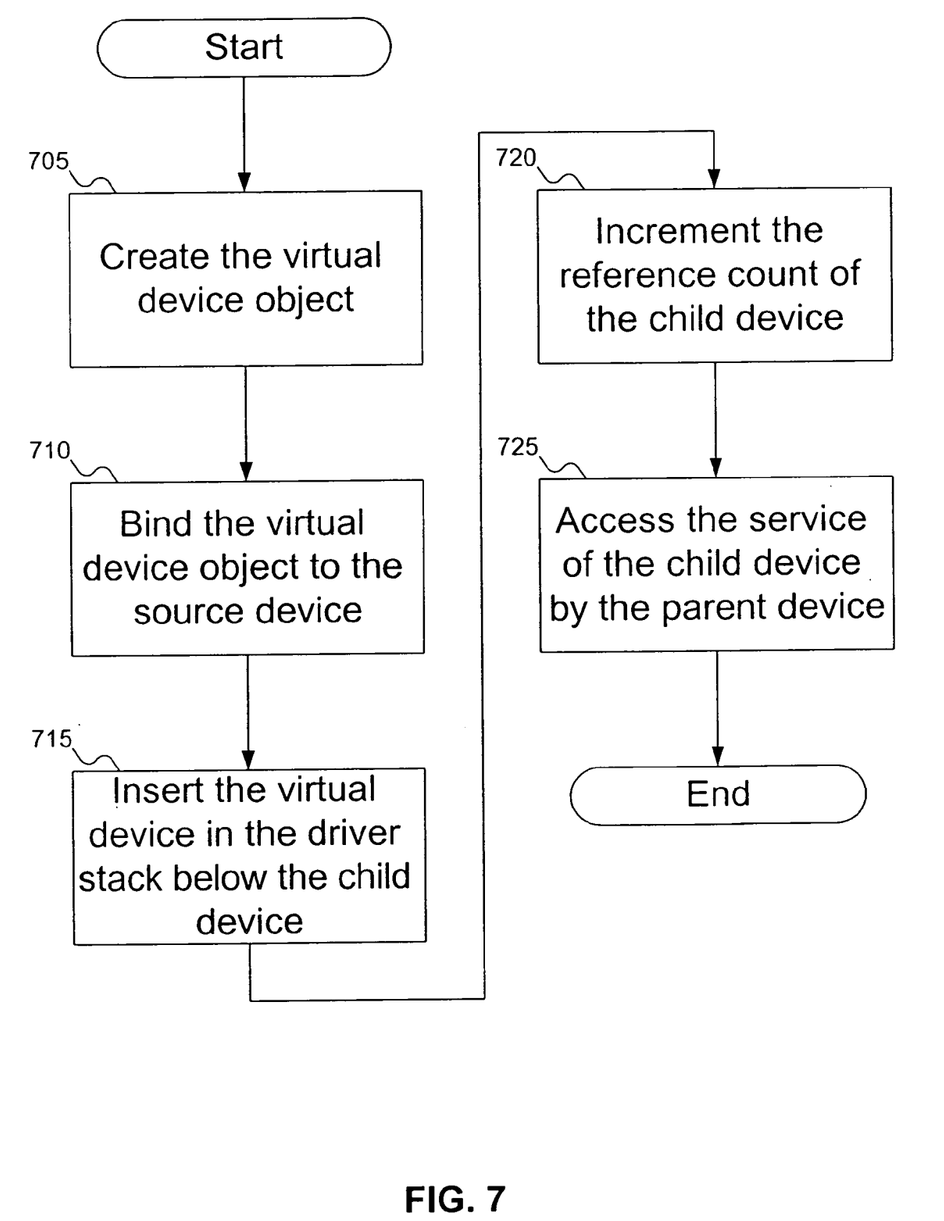
FIG. 7 shows the procedure used to enable a parent device to access a service provided by a child device in the operating system of FIG. 4 in accordance with the invention.

FIG. 7 shows the procedure used to enable a parent device to access a service provided by a child device in the operating system of FIG. 4 in accordance with the invention. At block 705, the new virtual device object is created. At block 710, the virtual device object is bound to the parent device. At block 715, the virtual device object is inserted into the driver stack below the child device whose services are sought. At block 720, the parent increments the reference count of the child device. Finally, at block 725, the parent device accesses the services of the child device.

Figure 8:
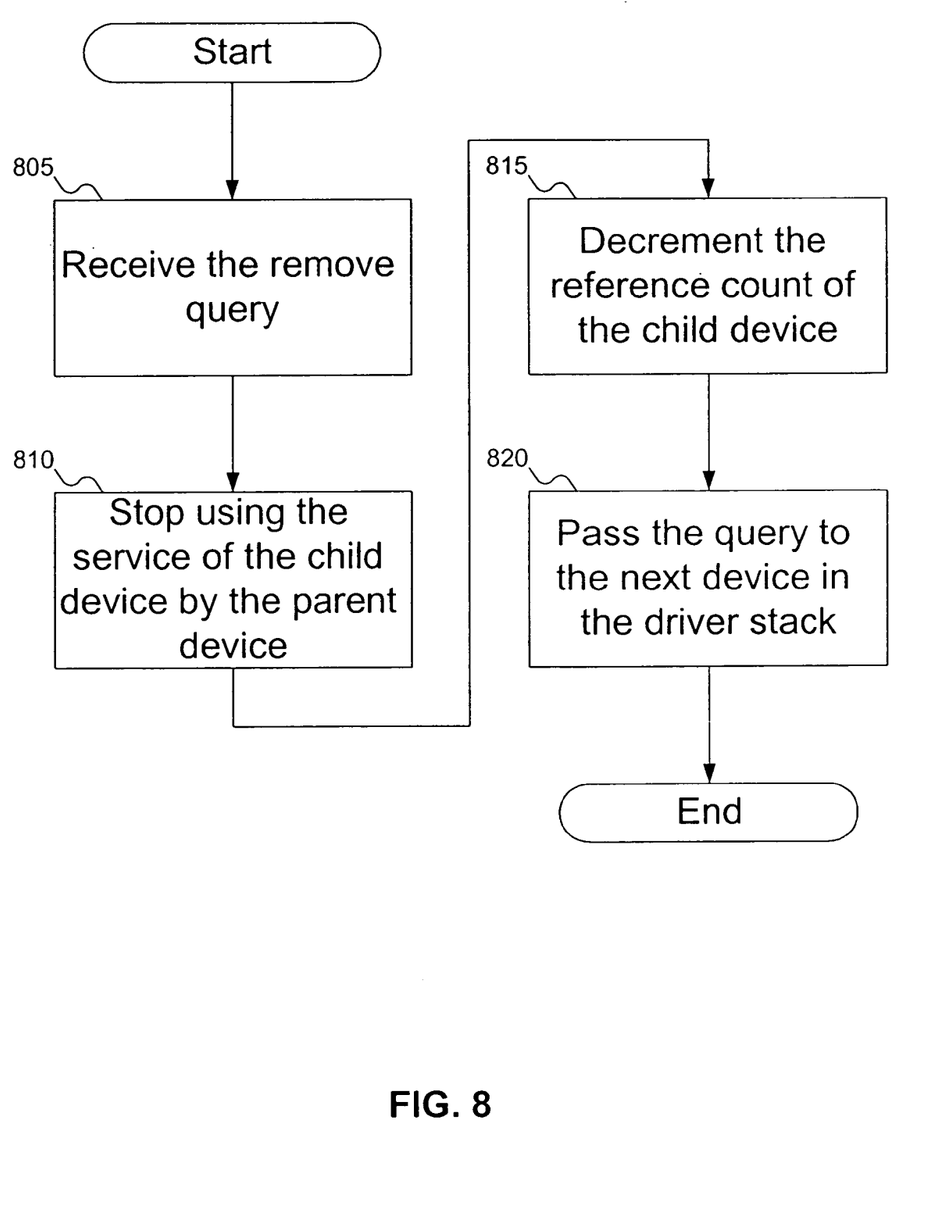
FIG. 8 shows the procedure used by the virtual device to process a remove query received from the operating system of FIG. 4 in accordance with the invention.

FIG. 8 shows the procedure used by the virtual device to process a remove query received from the operating system of FIG. 4 in accordance with the invention. At block 805, the virtual device receives the remove query. At block 810, the parent device stops using the services of the child device. At block 815, the parent device decrements the reference count of the child device. Finally, at block 820, the virtual device object passes the remove query to the next device in the driver stack.

Having illustrated and described the principles of my invention in an embodiment thereof, it should be readily apparent to those skilled in the art that the invention can be modified in arrangement and detail without departing from such principles. I claim all modifications coming within the spirit and scope of the accompanying claims.

I claim:

1. A method comprising:

creating a virtual device object representing a parent device;

binding the virtual device object to the parent device;

inserting the virtual device object in the driver stack below a child device;

accessing a service of the child device by the parent device with a request from the virtual device object on behalf of the parent device;

receiving at the virtual device object a remove query to remove the drive stack;

sending the remove query from the virtual device object to the parent device;

releasing by the parent device the service of the child device;

approving the remove query after the parent device has released the service of the child device;

passing the remove query from the virtual device object to the child device immediately above the virtual device object in the driver stack; and completing the remove query by removing the driver stack.

2. A method according to claim 1, wherein the driver stack is a dynamic driver stack.

3. A method according to claim 2, wherein accessing the service of the child device includes incrementing a reference count of a number of users of the service of the child device.

4. A method according to claim 2, wherein binding the virtual device object includes arranging the parent device to receive the remove query from the virtual device.

5. A method according to claim 2, wherein releasing the service of the child device includes invoking a code within the virtual device object that accesses the parent device.

6. A method according to claim 2, wherein releasing the service of the child device includes decrementing a reference count of a number of users of the service of the child device.

7. A method according to claim 2, wherein accessing the service of the child device includes accessing a second service of a second child device above the virtual device object in the dynamic driver stack.

8. The method according to claim 7, wherein releasing the service of the child device includes releasing the second service of the second child device above the virtual device in the dynamic driver stack prior to completing the remove query.

9. An article comprising:
a storage medium, said storage medium having stored thereon instructions, that, when executed by a computing device, result in:
creating a virtual device object representing a parent device;
binding the virtual device object to the parent device;
inserting the virtual device object in the driver stack below a child device; and
accessing a service of the child device by the parent device with a request from the virtual device object on behalf of the parent device;
receiving at the virtual device object a remove query to remove the driver stack;
sending the remove query from the virtual device object to the parent device;
releasing by the parent device the service of the child device;
approving the remove query after the parent device has released the service of the child device;
passing the remove query from the virtual device object to the child device immediately above the virtual device object in the driver stack; and
completing the remove query by removing the driver stack.

10. An article, according to claim 9, wherein the driver stack is a dynamic driver stack.

11. An article according to claim 10, wherein accessing the service of the child device includes incrementing a reference count of a number of users of the service of the child device.

12. An article according to claim 10, wherein binding the virtual device includes arranging the parent device to receive the remove query to remove the dynamic driver stack sent to the virtual device object.

13. An article according to claim 10, wherein releasing the service of the child device includes invoking a code within the virtual device object that accesses the parent device.

14. An article according to claim 10, wherein releasing the service of the child device includes decrementing a reference count of a number of users of the service of the child device.

15. An article according to claim 10, wherein accessing the service of the child device includes accessing a second service of a second child device above the virtual device object in the dynamic driver stack.

16. The article according to claim 15, wherein releasing the service of the child device includes releasing the second service of the second child device above the virtual device in the dynamic driver stack prior to completing the remove query.

17. An apparatus supporting removal of a driver stack, the apparatus comprising:
a computer including a hardware component requiring the driver stack;
an operating system running on the computer;
the driver stack loaded onto the operating system and supporting the hardware component, the driver stack including at least a parent driver and a child driver, the child driver providing a service accessed by the parent driver; and
a virtual driver object representing the parent driver, the virtual driver object bound to the parent driver and installed below the child driver in the driver stack, the virtual device object capable of receiving a remove query to remove the driver stack, the virtual device object further capable of sending the remove query to the parent device, the virtual device object approving the remove query after the parent device has released the service of the child device, the virtual device object then passing the remove query to the child device immediately above the virtual device object in the driver stack.

18. An apparatus according to claim 17, wherein the operating system is designed to support dynamic removal of the driver stack.

19. An apparatus according to claim 18, wherein the parent driver is adapted to insert the virtual driver object into the driver stack before accessing the service provided by the child driver.

20. An apparatus according to claim 18, wherein the child driver includes a reference count of a number of uses of the service.

21. An apparatus according to claim 20, wherein the parent driver is adapted to increment the reference count of the child driver before accessing the service provided by the child driver.

22. An apparatus according to claim 21, wherein the parent driver is adapted to decrement the reference count of the child driver after being informed by the virtual driver object that the driver stack is to be removed and stopping use of the service provided by the child driver.

* * * * *